(12) United States Patent
Wang et al.

(10) Patent No.: US 12,541,782 B2
(45) Date of Patent: Feb. 3, 2026

(54) METHOD, SYSTEM, AND COMPUTER-READABLE STORAGE MEDIUM FOR PRODUCT OBJECT PUBLISHING AND CONCURRENT IMAGE RECOGNITION

(71) Applicant: ALIBABA GROUP HOLDING LIMITED, Grand Cayman Islands (KY)

(72) Inventors: Nanyang Wang, Hangzhou (CN); Bin Wang, Hangzhou (CN); Yi Wang, Hangzhou (CN); Pan Pan, Beijing (CN); Yinghui Xu, Hangzhou (CN)

(73) Assignee: ALIBABA GROUP HOLDING LIMITED, George Town (KY)

(*) Notice: Subject to any disclaimer, the term of this patent is extended or adjusted under 35 U.S.C. 154(b) by 590 days.

(21) Appl. No.: 17/147,939

(22) Filed: Jan. 13, 2021

(65) Prior Publication Data
US 2021/0217071 A1 Jul. 15, 2021

(30) Foreign Application Priority Data
Jan. 14, 2020 (CN) .......................... 202010039111.9

(51) Int. Cl.
*G06Q 30/06* (2023.01)
*G06F 16/483* (2019.01)
(Continued)

(52) U.S. Cl.
CPC ....... *G06Q 30/0627* (2013.01); *G06F 16/483* (2019.01); *G06N 3/04* (2013.01); *G06V 20/20* (2022.01)

(58) Field of Classification Search
CPC .......................... G06Q 30/06; G06Q 30/0627
See application file for complete search history.

(56) References Cited

U.S. PATENT DOCUMENTS 8,762,852 B2  6/2014  Davis et al.
9,171,289 B2  10/2015 Kraft et al.
(Continued)

FOREIGN PATENT DOCUMENTS

CN  101840559 A  9/2010
CN  106469382 A  3/2017
(Continued)

OTHER PUBLICATIONS

Liu, Ziwei, et al. "Deepfashion: Powering robust clothes recognition and retrieval with rich annotations." Proceedings of the IEEE conference on computer vision and pattern recognition. (Year: 2016).*

(Continued)

*Primary Examiner* — Jeffrey A. Smith
*Assistant Examiner* — Jennifer V Lee
(74) *Attorney, Agent, or Firm* — Sheppard Mullin Richter & Hampton LLP

(57) ABSTRACT

Embodiments of the specification provide a product object publishing method and a system. The method includes: obtaining an image of a product object; sending the image to a server; receiving a plurality of types of product attribute information obtained by image recognition on the image of the product object performed by an image recognizer set; displaying the plurality of types of product attribute information for selection by a user; generating structured information of the product object according to selection of the product attribute information; and publishing the product object, wherein the publishing comprises publishing the image and the structured information of the product object. Accuracy and efficiency of product object publishing can be improved.

15 Claims, 7 Drawing Sheets

(51) Int. Cl.
  *G06N 3/04*      (2023.01)
  *G06Q 30/0601*   (2023.01)
  *G06V 20/20*     (2022.01)

(56) References Cited

U.S. PATENT DOCUMENTS

| | | | |
|---|---|---|---|
| 9,547,873 | B2 | 1/2017 | Rhoads |
| 9,595,059 | B2 | 3/2017 | Knudson et al. |
| 9,679,332 | B2 | 6/2017 | Kim et al. |
| 10,074,118 | B1 | 9/2018 | Johnson et al. |
| 10,319,022 | B2 | 6/2019 | Clayton et al. |
| 10,755,341 | B2 | 8/2020 | Rhoads |
| 2011/0099085 | A1* | 4/2011 | Hamilton .......... G06Q 30/0282 705/347 |
| 2013/0297382 | A1 | 11/2013 | Yan |
| 2014/0214817 | A1* | 7/2014 | Hu .................. G06F 16/90324 707/723 |
| 2014/0279288 | A1* | 9/2014 | Wouk ............... G06Q 30/0643 705/27.2 |
| 2015/0310601 | A1 | 10/2015 | Rodriguez et al. |
| 2016/0210513 | A1* | 7/2016 | Wang .................... G06V 40/10 |
| 2017/0132497 | A1 | 5/2017 | Santos et al. |
| 2017/0316034 | A1 | 11/2017 | Chen et al. |
| 2018/0089735 | A1 | 3/2018 | Lenahan et al. |
| 2018/0137087 | A1 | 5/2018 | Chakraborty et al. |
| 2018/0268454 | A1 | 9/2018 | Johnson et al. |

FOREIGN PATENT DOCUMENTS

| | | | | |
|---|---|---|---|---|
| CN | 107169425 | A | | 9/2017 |
| CN | 107861972 | A | | 3/2018 |
| CN | 110210470 | A | | 9/2019 |
| CN | 106469184 | B | | 12/2019 |
| CN | 111898536 | A | * | 11/2020 ......... G06K 9/00375 |
| EP | 3257222 | B1 | | 10/2019 |
| KR | 102186242 | B1 | | 12/2020 |
| WO | 2012030678 | A2 | | 3/2012 |
| WO | 2013159608 | A1 | | 10/2013 |
| WO | 2016116018 | A1 | | 7/2016 |
| WO | WO-2018179151 | A1 | * | 10/2018 ......... G06K 9/00228 |
| WO | 2019226021 | A1 | | 11/2019 |

OTHER PUBLICATIONS

Written Opinion and International Search Report for PCT Application No. PCT/US2021/013225 mailed on Apr. 1, 2021.
First Search for Chinese Application No. 202010039111.9 mailed on Dec. 26, 2023.
Wang et al., "Research on clothing classification and recommendation methods based on image content," Jan. 15, 2018, English Abstract provided.
Chen et al., "Structure-Aware Deep Learning for Product Image Classification," Jan. 24, 2019.
Ren et al., "Mogujie 11·11: A brief analysis of the application of image algorithms in e-commerce promotions," Nov. 10, 2017, https://www.infoq.cn/article/meili-11-11-image-algorithm.

* cited by examiner

METHOD, SYSTEM, AND COMPUTER-READABLE STORAGE MEDIUM FOR PRODUCT OBJECT PUBLISHING AND CONCURRENT IMAGE RECOGNITION

CROSS-REFERENCE TO RELATED APPLICATION

This application is based on and claims priority to and benefit of Chinese Patent Application No. 202010039111.9, filed with the China National Intellectual Property Administration (CNIPA) on Jan. 14, 2020. The entire content of the above-identified application is incorporated herein by reference.

TECHNICAL FIELD

This specification relates to the field of computer technologies, and in particular, to a product object publishing method and apparatus, a product object recognition method and apparatus, an electronic device, and a storage medium.

BACKGROUND

After purchasing products, users may not use or seldom use some of the products and can publish the second-hand products on second-hand product websites for sale.

However, the second-hand product websites generally require a user to fill in various information about a product, for example, description information such as a name of the product, a model of the product, a size of the product, a brand of the product, and other information that the user intends to edit, and then the product can be published.

However, the user does not always know a to-be-sold second-hand product very well, and sometimes is not clear about the detailed information of the product, for example, a model, a brand, and a size. Consequently, information about the product is not filled in accurately enough, resulting in inaccurate published product information.

SUMMARY

Embodiments of the specification provide a product object publishing method, to improve accuracy of information about the published products.

Correspondingly, the embodiments of the specification further provide a product object publishing apparatus, a product object recognition method and apparatus, an electronic device, and a storage medium, to ensure implementation and application of the foregoing system.

To resolve the foregoing problems, the embodiments of the specification disclose a product object publishing method. The method includes: obtaining an image of a product object; receiving a plurality of types of product attribute information, wherein the product attribute information is obtained according to recognition on the image of the product object performed by an image recognizer set; generating structured information of the product object according to selection of the product attribute information; and publishing the product object according to the structured information of the product object.

In a first aspect, a method for publishing a product object is provided. The method includes: by a client, obtaining an image of a product object; sending the image to a server; receiving a plurality of types of product attribute information obtained by image recognition on the image of the product object performed by an image recognizer set; displaying the plurality of types of product attribute information for selection by a user; generating structured information of the product object according to selection of the product attribute information; and publishing the product object including publishing the image and the structured information of the product object.

In an embodiment, obtaining an image of a product object comprises: displaying a publishing setting page, wherein a shooting option is provided in the publishing setting page; and invoking, according to triggering of the shooting option, a shooting component of the client to shoot an image of the product object.

In an embodiment, sending the image comprises generating a recognition request according to the image of the product object and sending the recognition request to the server; receiving a plurality of types of product attribute information comprises receiving a recognition response corresponding to the recognition request, wherein the recognition response comprises the plurality of types of product attribute information of the product object.

In an embodiment, the recognition response further comprises association relationships among the plurality of types of product attribute information. Generating structured information of the product object according to selection of the product attribute information comprises: receiving a selection instruction for target product attribute information; determining, according to the association relationships, product attribute information associated with the target product attribute information; displaying the product attribute information associated with the target product attribute information for selection; and generating, based on a hierarchical structure, the structured information of the product object according to a plurality of pieces of selected product attribute information.

In an embodiment, the method further comprises: determining, by the client according to the plurality of types of product attribute information, a plurality of attribute tags, wherein each type of product attribute information corresponds to at least one attribute tag of the plurality of attribute tags; and displaying, by the client, the plurality of attribute tags of the product object in an attribute setting page.

In an embodiment, generating structured information of the product object according to selection of the product attribute information comprises: receiving a selection instruction in the attribute setting page, and determining a selected attribute tag; and generating the structured information of the product object according to the selected attribute tag.

In an embodiment, the method further comprises: receiving, by the client, a custom tag in the attribute setting page, and adding the custom tag to the structured information of the product object.

The embodiments of the specification further disclose a product object recognition method. The method includes: receiving an image of a product object; inputting the image into an image recognizer set to obtain a plurality of types of product attribute information; and returning the plurality of types of product attribute information, to determine structured information of the product object according to the product attribute information, and to publish the product object.

In a second aspect, a method for recognizing a product object is provided. The method comprises: by a server, receiving, from a client, an image of a product object; inputting the image into an image recognizer set to obtain a plurality of types of product attribute information, wherein the image recognizer set comprises a plurality of types of image recognizers each corresponding to one of the plurality of types of product attribute information; and returning, to the client, the plurality of types of product attribute information for the client to determine structured information of the product object according to the product attribute information, and publish the product object.

In an embodiment, inputting the image into an image recognizer set to obtain a plurality of types of product attribute information comprises inputting the image into the plurality of types of image recognizers concurrently for recognition to obtain the plurality of types of product attribute information.

In an embodiment, each type of image recognizer comprises a plurality of sub-recognizers. Inputting the image into an image recognizer set to obtain a plurality of types of product attribute information comprises: inputting, for one of the types of image recognizers, the image into the plurality of sub-recognizers of the one image recognizer concurrently for recognition; determining sub-recognition results outputted by the plurality of sub-recognizers respectively; and combining the plurality of sub-recognition results to obtain product attribute information of the target type.

In an embodiment, each of the plurality of types of image recognizers is obtained through training according to a deep convolutional neural network, and training data of the each of the plurality of types of image recognizers is determined according to product object information of an eCommerce website.

In an embodiment, the product object information comprises target structured information of a target product object, and the target structured information is related to a type of the product attribute information.

In an embodiment, the type of the product attribute information comprises at least one of the following items: a brand, a category, a leaf category, or a standard product unit (SPU).

In an embodiment, the receiving an image of a product object comprises receiving a recognition request, and obtaining the image of the product object from the recognition request, and the returning the plurality of types of product attribute information comprises adding the plurality of types of product attribute information to a recognition response, and returning the recognition response.

In an embodiment, the method further comprises: determining, by the server, a popular tag corresponding to the product object according to the plurality of types of product attribute information, wherein the popular tag is determined by collecting statistics on information related to the product object; and including the popular tag in the product attribute information.

In a third aspect, a product object publishing system is provided. The system comprises a processor and a non-transitory computer-readable storage medium storing instructions executable by the processor to cause the system to perform operations. The operations comprise: obtaining an image of a product object; sending the image to a server; receiving a plurality of types of product attribute information obtained by image recognition on the image of the product object performed by an image recognizer set; displaying the plurality of types of product attribute information for selection by a user; generating structured information of the product object according to selection of the product attribute information; and publishing the image and the structured information of the product object.

The embodiments of the specification further disclose a product object publishing apparatus. The apparatus includes: an image obtaining module, configured to obtain an image of a product object; an attribute information receiving module, configured to receive a plurality of types of product attribute information, wherein the product attribute information is obtained according to recognition on the image of the product object performed by an image recognizer set; a structured information generation module, configured to generate structured information of the product object according to selection of the product attribute information; and a product publishing module, configured to publish the product object according to the structured information of the product object.

The embodiments of the specification further disclose a product object recognition apparatus. The apparatus includes: an image receiving module, configured to receive an image of a product object; an attribute information generation module, configured to input the image into an image recognizer set to obtain a plurality of types of product attribute information; and an attribute information sending module, configured to return the plurality of types of product attribute information, to determine structured information of the product object according to the product attribute information, and publish the product object.

The embodiments of the specification further disclose an electronic device, including a processor, and a memory storing executable code, wherein the executable code, when executed, causes the processor to perform the product object publishing method according to one or more of the foregoing embodiments.

The embodiments of the specification further disclose one or more machine-readable media storing executable code, wherein the executable code, when executed, causes a processor to perform the product object publishing method according to one or more of the foregoing embodiments.

The embodiments of the specification further disclose an electronic device, including a processor, and a memory storing executable code, wherein the executable code, when executed, causes the processor to perform the product object recognition method according to one or more of the foregoing embodiments.

The embodiments of the specification further disclose one or more machine-readable media storing executable code, wherein the executable code, when executed, causes a processor to perform the product object recognition method according to one or more of the foregoing embodiments.

Compared with existing technologies, the embodiments of the specification include the following advantages.

In the embodiments of the specification, product attribute information of a to-be-published product object can be recognized by a recognizer based on an image of the product object and can be provided to a user, to enable the user to select structured information from the recognized product attribute information, set the structured information of the product object, and quickly publish the product object, thereby improving accuracy and efficiency for publishing the product object.

DETAILED DESCRIPTION

To make the foregoing objectives, features, and advantages of the specification clearer and more comprehensible, the following further describes the specification in detail with reference to the accompanying drawings and specific implementations.

Embodiments of the specification may be applied to eCommerce systems including various eCommerce systems selling product objects based on networks, such as eCommerce systems selling brand-new product objects and eCommerce systems selling second-hand product objects.

A user (also referred to as a seller or a merchant) may publish a product object on an eCommerce website for sale. For publishing each product object, specific structured information usually needs to be filled in. The structured information is feature information that represents attributes of a product and that has a hierarchical relationship/structure. For a product object, structured information thereof generally includes various information such as a name, a category, and an attribute of the product object. For example, if a product is a stainless-steel vacuum flask, structured information corresponding to the stainless-steel vacuum flask may include feature information such as Category: Flask, Sub-category: Vacuum flask, and other attribute features under the sub-category such as Material: Stainless steel, Color: Black, and Brand.

Figure 2:
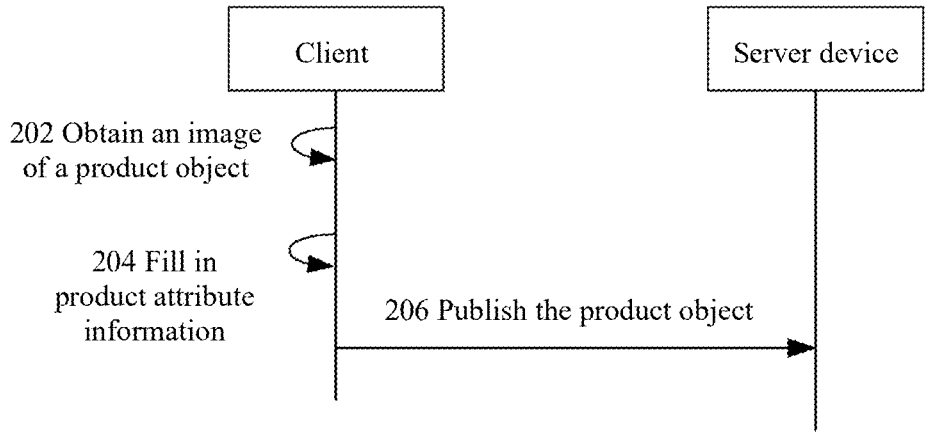
FIG. 2 is a flowchart of a product publishing method, according to existing technologies.

FIG. 2 is a flowchart of publishing a product method, according to existing technologies. A process of publishing a product by a user through a client or a client device is as follows. In step 202, the user may obtain an image of a product object through a client, for example, shoot an image of the product object or obtain a pre-shot image of the product object. Then in step 204, the user may fill in product attribute information as structured information on the client, for example, select a category of the to-be-published product, and set other attributes. When filling in the structured information of the product object, the user sometimes is not clear about the accurate content of the product object. Consequently, such a filling manner may cause an error. For example, a seller selling a second-hand product object, or a user, such as a seller (or a merchant) that has just entered an eCommerce website, is unfamiliar with a product object, rules of the website, or the like, resulting in problems such as difficulty in filling in structured information of the product object, and poor accuracy of structured information of the product object. After filling in various information about the product, in step 206, the user may upload the image of the product object and the filled in various information, and publish the product object to a server device, to sell or trade the product object and so on. However, because information of the product object is inaccurately filled in, a buying user usually cannot find the product object during searching, further resulting in various problems in selling or trading the product object.

For the foregoing technical problems, in the embodiments of the specification, during publishing of a product object, attribute information of the product object may be automatically recognized based on an image of the to-be-published product object. The image recognition may be performed according to a standard, a rule, and the like of structured information of a website. Therefore, a user may select the structured information from the recognized product attribute information and publish the product object accordingly, so that accuracy and efficiency for publishing the product object can be improved, and a success rate of selling the product object can also be improved.

Figure 1:
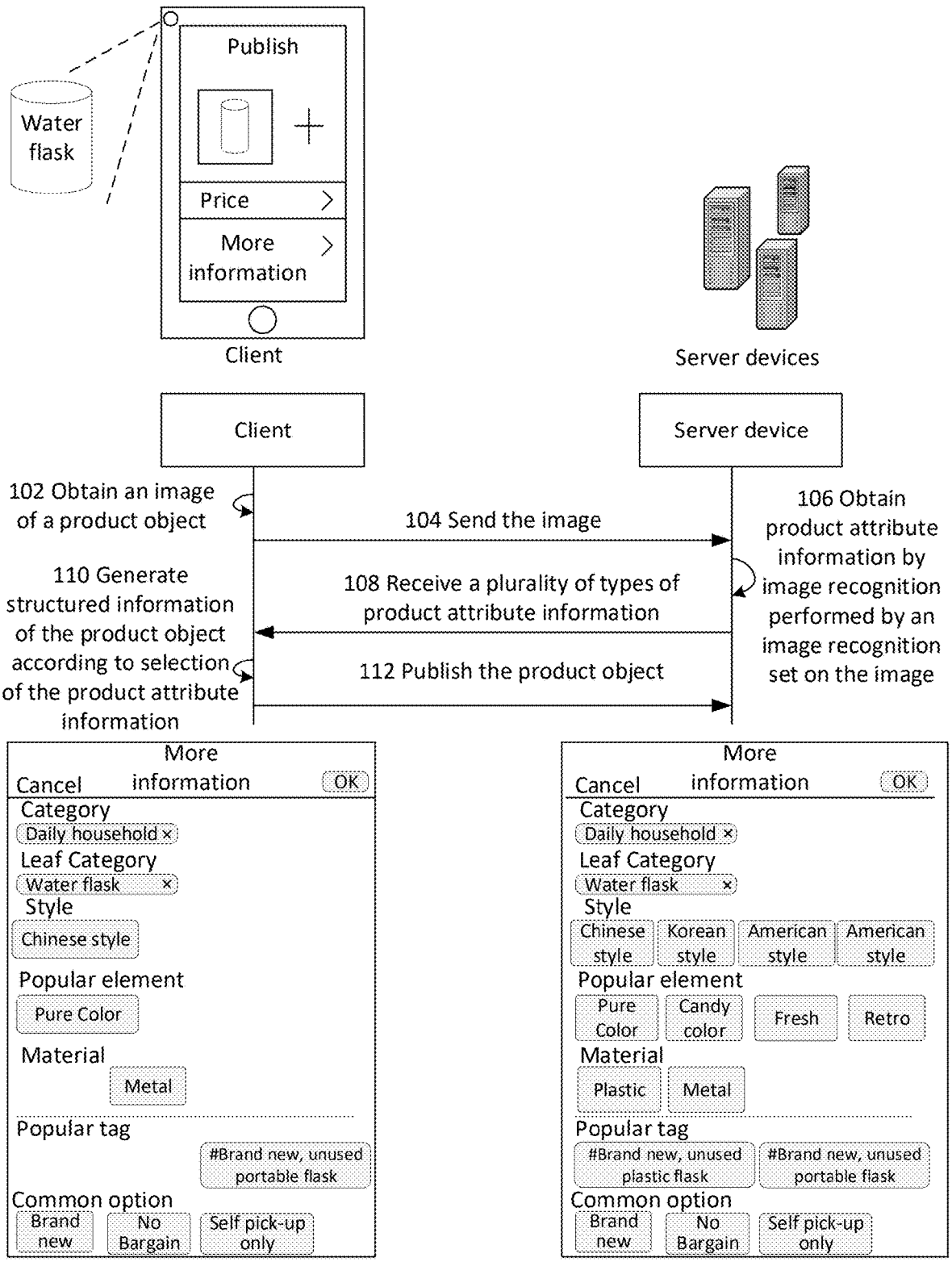
FIG. 1 is a schematic diagram of a product publishing scenario, according to an embodiment of the specification.

FIG. 1 is a schematic diagram of a product publishing scenario. A user may perform, through a client on a terminal device, editing operations required for publishing a product object, and publish the product object. The terminal device may include a computer terminal such as a PC, and a mobile terminal such as a mobile phone or a tablet computer. Upon image recognition performed by a server or a server device on the product object, the terminal device may publish the product object after selecting the structured information based on the recognized attribute information.

Interactions may be illustrated by an example of publishing a product shown in FIG. 1.

The user, after entering a publishing setting page by operating on the client, may obtain an image of the product object in step 102. For example, the user may choose to invoke an image capturing device, such as a camera, of the client to capture an image of the product object, or may directly select an image of the product object pre-stored on the client.

In an embodiment of the specification, in step 102, the obtaining an image of the product object may include: providing a publishing setting page where a shooting option is provided in the publishing setting page, and upon triggering of the shooting option, invoking a shooting component to capture an image of the product object.

For example, the shooting option is provided in the publishing setting page of the client, and the client invokes a shooting component (for example, a camera) to shoot an image of the product object when the user triggers the shooting option. In another example, when the user triggers the shooting option, an interface of an album application corresponding to the shooting component may be invoked, and the user may select a pre-shot image of the product object from the album application.

After the client obtains the image of the product object, the user may operate the client to set data, such as the structured information and the description information required for product publishing. To set the structured information more accurately and quickly, in step 104, the image of the product object may be sent to the server device. After receiving the image of the product object, the server device, in step 106, may input the image into a corresponding image recognizer set for recognition, to obtain a plurality of types of product attribute information.

The image recognizer set refers to a cluster (or a set or a pool) of image recognizers formed by a plurality of image recognizers. Each image recognizer is generally obtained through training based on a specific image recognition algorithm model. For example, an image recognition model is trained by using a machine learning algorithm based on a convolutional neural network, a deep convolutional neural network, or the like. A trained image recognition model is used as an image recognizer. Therefore, the image recognizer may also be referred to as an image recognition model, an image feature mapping set, an image classifier, or the like. A mathematical model is a mathematical structure generally or approximately described with a mathematical language in accordance to correlations of features or quantity of an object system. Such a mathematical structure is a pure relational structure of a system represented using mathematical symbols. The mathematical model can reflect a mathematical relational structure of a specific problem or a specific object system. In this sense, the mathematical model may also be interpreted as a mathematical expression linking internal relationships among variables in a system.

In this embodiment of the specification, the structured information of the product object may be described through various pieces of product attribute information of the product object. Therefore, the product attribute information of the product object may be recognized through the image recognizer set. Because the product attribute information may include a plurality of types, different types of image recognizers may be trained for different types of product attribute information. Therefore, the image recognizer set includes a plurality of types of image recognizers.

The type of the product attribute information may be determined according to the structured information of the published product. For example, the type of the product attribute information may include a classification attribute such as a category or a leaf category of the product, or may include a description attribute such as a brand, a feature, or a status of the product object. In an embodiment of the specification, the product attribute information may include a plurality of types of product attribute information such as a brand, a category, a leaf category, a material, a model, and details. The product attribute information includes attribute names and attribute values. Different types of image recognizers may recognize attribute values of the product object corresponding to different attribute names. The category and the leaf category may also be referred to as multi-level categories. The multi-level categories of the product object may be recognized through one or more image recognizers.

In this embodiment of the specification, training data for training the image recognizers is determined through product object information of an eCommerce website. The product object information of the eCommerce website may include the pictures of the product objects and the structured information of the product objects. Each image recognizer in the image recognizer set may be trained based on the structured information of the products published on the eCommerce website. The structured information and images of published product objects may be pulled from a database of the eCommerce website, and then input into the image recognizer as the training set data for training. Therefore, accuracy of the trained image recognizer is improved based on large data of the eCommerce website, which is more beneficial to publishing the product object on the eCommerce website.

In an embodiment of the specification, the inputting the image into an image recognizer set to obtain a plurality of types of product attribute information includes: concurrently inputting the image into the plurality of types of image recognizers for recognition, to obtain the plurality of types of product attribute information.

To improve recognition efficiency, the plurality of types of image recognizers in the image recognizer set may concurrently provide services. Therefore, the image of the product object may be inputted into the plurality of types of image recognizers of the image recognizer set concurrently for recognition. Each type of image recognizer may recognize the image and output a corresponding recognition result, that is, the product attribute information of a corresponding type.

Using an example in which the image recognizer set includes six types of image recognizers, the six types of image recognizers may respectively recognize multiple types of the product attribute information, such as a brand, a category, a leaf category, a material, a model, and details of the product object. More types of image recognizers may further be set to recognize different types of details such as a color, a style, a popular element, and a pattern, which may be set, trained, or recognized according to requirements. These are not limited in this embodiment of the specification.

In this embodiment of the specification, each image recognizer may recognize one or more types of product attribute information, for example, recognize product attribute information of one or more categories, one or more details, or the like, thereby providing the product attribute information recognition efficiency through the concurrent recognitions. In the server device, the different types of image recognizers may be distributed on the same device or different devices, for example, distributed on the same server or different servers, distributed on different servers of a server cluster, or distributed on different virtual machines, which may be determined according to the server device.

In this embodiment of the specification, to improve the accuracy or efficiency of the recognition, each image recognizer may further adopt a distributed architecture, so that each type of image recognizer includes a plurality of sub-recognizers. The sub-recognizers may form an image recognizer of a corresponding type together. An image recognizer may be formed by using the plurality of sub-recognizers together based on reasons such as an algorithm of the image recognizer or a processing capability of a server device.

In an embodiment of the specification, if all of the different sub-recognizers can recognize the product attribute information of a target type, the recognition results of the sub-recognizers may be screened by voting, to obtain the product attribute information of the target type. For example, for the same attribute name, attribute values recognized by the different sub-recognizers may be the same or different. One of the attribute values may be selected by voting, and together with the attribute name, be used as the product attribute information. In another embodiment, a final attribute value may be determined by performing a weighted calculation on the attribute values, and together with the attribute name, be used as the product attribute information. The screening manner may be determined according to the type of the product attribute information. A brand name may be determined by voting, a style may be determined by a weighted calculation, and so on.

In another embodiment of the specification, the different sub-recognizers may recognize a portion of the product attribute information of a type, so that the product attribute information of a corresponding type may be obtained by combining sub-recognition results of the plurality of sub-recognizers. Recognition performed by an image recognizer of each target type may be implemented through the following steps: inputting, for an image recognizer of a target type, the image into the plurality of sub-recognizers concurrently for recognition; determining sub-recognition results output by the plurality of sub-recognizers respectively; and combining the plurality of sub-recognition results, to obtain the product attribute information of the target type. For example, for a brand, if the different sub-recognizers may recognize a portion of features of the brand, all the features of the brand may be obtained by combining the sub-recognition results of the different sub-recognizers, thereby determining the product attribute information of the brand.

In this embodiment of the specification, the plurality pf sub-recognizers included in each image recognizer may be set in a device such as the same device or a plurality of different devices such as servers and virtual machines, or may be set according to a requirement. For the distributed architecture of the sub-recognizer adopted by the image recognizer, the sub-recognizers of the image recognizer may be trained in a manner of concurrent data and concurrent training, so that the different recognizers may be concurrently trained by using different training data, or certainly by using the same training data, thereby improving the training efficiency of the recognizers.

In this embodiment, the image recognizer is determined through the product object information of the eCommerce website. The product attribute information generated by the image recognizer is related to the product object information of the eCommerce website. A buyer may find, through searching, the product of the user more conveniently, thereby facilitating a transaction of the product.

In an embodiment of the specification, the server device may further determine, according to the product attribute information of the target type, at least one attribute tag corresponding to the target type. Therefore, the plurality of types of product attribute information returned by the client include a plurality of types of attribute tags, and each type of product attribute information corresponds to at least one attribute tag of the plurality of attribute tags. In the plurality of types of product attribute information obtained through recognition by the server device, an attribute tag may be generated for each piece of attribute information, so that the plurality of types of attribute tags are added to a recognition response, and are returned to the client. The client displays the plurality of types of attribute tags for the user to select, to obtain the structured information corresponding to the product object.

In some embodiments of the specification, the server device may pre-analyze related information of various product objects, to determine some popular tags. The popular tags are relatively popular tags corresponding to the product object, for example, a tag that is used more frequently when a product object is published, a tag that is determined according to a search keyword that is used more frequently during the searches of the product object, and a tag that is formed by combining a plurality of attribute tags. Therefore, the server device may further determine a popular tag corresponding to the product object according to the plurality of types of product attribute information. The popular tag is determined by collecting statistics on information related to the product object. The popular tag may be added to the recognition response as the product attribute information.

For example, after determining the plurality of types of product attribute information corresponding to the product object, the server device may further determine popular tags of the product object. For example, the server device may collect statistics in advance based on search keywords corresponding to a buyer who purchases the product object. According to a ratio between a number of times of a search keyword shown in purchasing the product object and a number of times of the search keyword shown in viewing the product object, or a search frequency, a quantity of searches, or the like of a search keyword corresponding to each product object, top N search keywords may be obtained and set as popular tags of the product object, and a weight corresponding to a popular tag may be set for subsequent selection. In some other embodiments, statistics may be collected on a probability of a recognized attribute tag being selected. The statistics of the probability that an attribute tag corresponding to each type of product object is selected is collected according to features, such as a category of the product object, to select an attribute tag as a popular tag of the product object. In some embodiments, a popular tag may also be formed by combining different types of tags. For example, a popular tag is "Brand new, unused plastic Flask," "Brand new, unused portable Flask," or the like. Different types of attribute tags each having a high popularity and a high probability of being selected may be used as popular tags.

Figure 5:
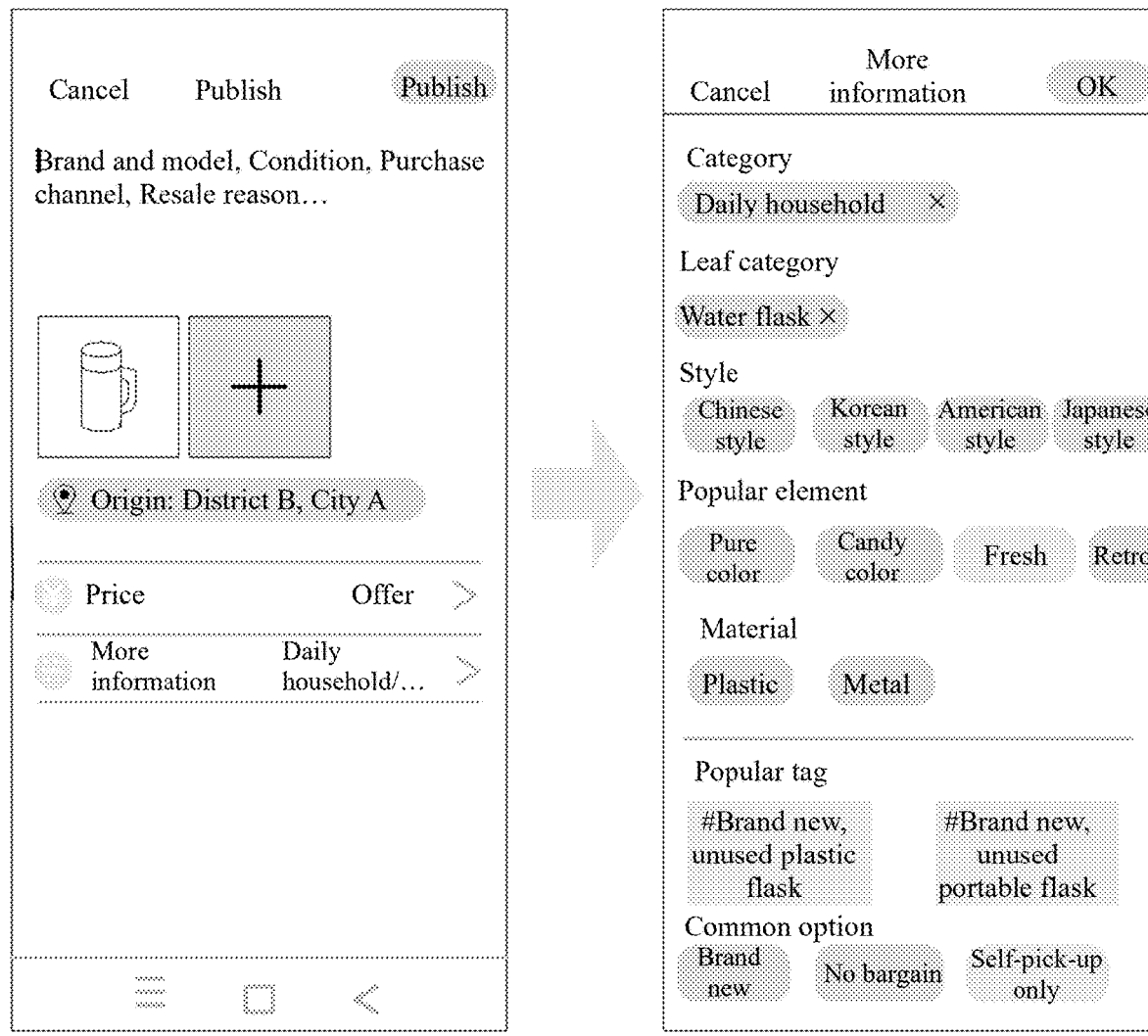
FIG. 5 is a schematic diagram of a scenario of an example of a client-side page, according to an embodiment of the specification.

As shown in FIG. 5, after receiving the recognition response, the client may display the popular tags in the attribute setting page for the user to select.

After the server device obtains the plurality of types of product attribute information, the server device, in step 108, may send the plurality of types of product attribute information to the client. The client may receive the plurality of types of product attribute information accordingly.

In an embodiment of the specification, the client may generate a recognition request according to the image of the product object, and send the recognition request to the server device. A corresponding server device may also generate a recognition response by using the plurality of types of product attribute information obtained through the recognition, and then send the recognition response to the client.

In an embodiment of the specification, that the client, after sending the recognition request to the server device, receives the plurality of types of product attribute information may include: receiving a recognition response corresponding to the recognition request, wherein the recognition response includes a plurality of types of product attribute information of the product object. The client may obtain the plurality of types of product attribute information from the recognition response.

For example, after obtaining the image of the product object, the client may add the image of the product object to the recognition request. The client sends the recognition request to the server device, to invoke the image recognizer set through an image recognition interface of the server device, to perform the image recognition. The plurality of types of product attribute information are obtained, and are returned through the interface. The plurality of types of product attribute information may be added to the recognition response as carried parameters, and the recognition response is returned to the client.

In this embodiment of the specification, association relationships may also exist among the different types of product attribute information. The association relationships may be pre-established and pre-stored. After the different types of product attribute information are recognized through the image recognizer set, the association relationships among the different types of product attribute information may be searched for, and then the association relationships among the different types of product attribute information are added to the recognition response. The association relationships may be determined according to the product object information of the eCommerce website. For example, a product object has features of sub-categories having different functions under a category. For example, a Flask may be a portable Flask, or may be a vacuum flask. One of the sub-categories is selected, and another sub-category may be provided as an attribute of the product. Therefore, when the client displays the product attribute information such as an attribute tag, different product attribute information may be associated and displayed according to the association relationships.

In an embodiment of the specification, the recognition response received by the client may include association relationships among the plurality of types of product attribute information. The step of generating, by the client, the structured information of the product object according to the selection of the product attribute information may include: receiving a selection instruction for target product attribute information; determining, according to the association relationships, product attribute information associated with the target product attribute information; displaying the product attribute information associated with the target product attribute information for selection; and generating, based on a hierarchical relationship or structure, the structured information of the product object according to a plurality of pieces of selected product attribute information.

For example, the client displays the product attribute information, such as the attribute tags, of the product object according to the recognition response. When a user makes a selection instruction for a specific piece of target product attribute information, the client may determine, according to association relationships among the product attribute information, product attribute information associated with the target product attribute information, and then displays the associated product attribute information in the attribute setting page. The product attribute information associated with the target product attribute information may be a specific type of product attribute information that is already displayed in the attribute setting page. A displaying position or a displaying order of the displayed product attribute information may be adjusted according to the target product attribute information. The product attribute information associated with the target product attribute information may be product attribute information that has not yet displayed in the attribute setting page. Such product attribute information may be displayed in the attribute setting page according to the target product attribute information, thereby dynamically updating and displaying the product attribute information such as the attribute tags.

For example, product attribute information displayed for a product object includes: Category: mobile digital, electronic product; Sub-category: tablet computer, pad, and the like; Size: 7.9 inches, 9.7 inches, 10.5 inches, 12.9 inches, or the like; and Model: Mini, New, Air, Pro, or the like. If a selected category is mobile digital, a selected sub-category is Tablet computer, and a selected size is 7.9 inches, a displayed model may be dynamically adjusted to Mini or Mini2 for a user to select. In another example, only one of a size and a model is displayed by default. Based on a piece of selected product attribute information, another type of product attribute information associated with the selected product attribute information is dynamically displayed.

In this embodiment of the specification, after each type of product attribute information is selected, a hierarchical relationship or structure of the product attribute information may be determined based on a type. For example, in a hierarchical structure, a first level is a category, a second level is a sub-category, a third level is features of each product attribute, and so on, so that the structured information of the product object may be generated based on the hierarchical relationship or structure. For product attribute information having the association relationships, when a user selects the target product attribute information, the associated product attribute information may be dynamically displayed for the user to select.

After receiving the plurality of types of product attribute information, the client, in step 110, may generate the structured information of the product object according to selection of the product attribute information. The structured information is the feature information that represents attributes of a product and that has a hierarchical relationship or structure. The client may display the plurality of pieces of product attribute information for a user to select, determine the product attribute information selected by the user, and combine the selected product attribute information into the structured information of the product object.

In an embodiment of the specification, the client may determine at least one attribute tag corresponding to a target type according to the product attribute information of the target type. On the attribute setting page, the attribute tag of the product object may be displayed based on types. Generating the structured information of the product object according to selection of the product attribute information includes: receiving a selection instruction in the attribute setting page, determining a selected attribute tag, and generating the structured information of the product object according to the selected attribute tag. The user may select attribute tags under different types in the attribute setting page, and combining the selected attribute tags of different types into the structured information of the product object.

For example, three types of product attribute information are received and are displayed in the attribute setting page respectively. Attribute tags of a brand type include a brand A, a brand B, and a brand C. Attribute tags of a category include a category D and a category F. Attribute tags of a detail type include a color G and a color H. If the user selects the product attribute information corresponding to the product object on the client, for example, select the brand A, the category D, and the color G, the structured information corresponding to the product object may be obtained accordingly.

In an embodiment of the specification, the client may receive a custom tag in the attribute setting page, and add the custom tag to the structured information of the product object.

When setting the structured information of the product object and selecting the product attribute, the user sometimes further needs to set some customized content. Therefore, the embodiments of the specification further provide a function of a custom tag in the attribute setting page, for example, provide controllers, such as an input box and an interface for adding a custom tag, so that the user may customize a needed tag, and describe the product object more accurately. For example, if a product of the user is a commemorative edition or a limited edition, a feature of the commemorative edition or the limited edition of the product may be described through a custom tag such as a commemorative edition name or a limited edition number, thereby describing the product object more accurately.

In an embodiment of the specification, the attribute setting page may further include some default attributes. For example, in an example of publishing a second-hand product object, an attribute tag of Condition may be set by default to Brand new, Almost new, or the like.

After the structured information of the product object is obtained, in step 112, the product object may be published according to the structured information of the product object. After selecting the structured information of the product object, the user may further edit published information in the publishing setting page, and publish the product object according to the published information and the structured information of the product object. For example, a name or a published title of the product object may also be edited. Information, such as a price or inventory, about the product object, and time information related to the product object, such as expiration date of a product object having an effective period or a production date of a product object, may also be set.

In this embodiment, product attribute information of a to-be-published product object can be recognized by the image recognizer set based on an image of the product object. The product attribute information is provided to the user, to quickly set the structured information of the product, and publish the product object with reference to the edited published information of the product object. In a process of publishing the product object, the user does not need to fill in all the product information, so that the user can publish the product object more conveniently.

Figure 3:
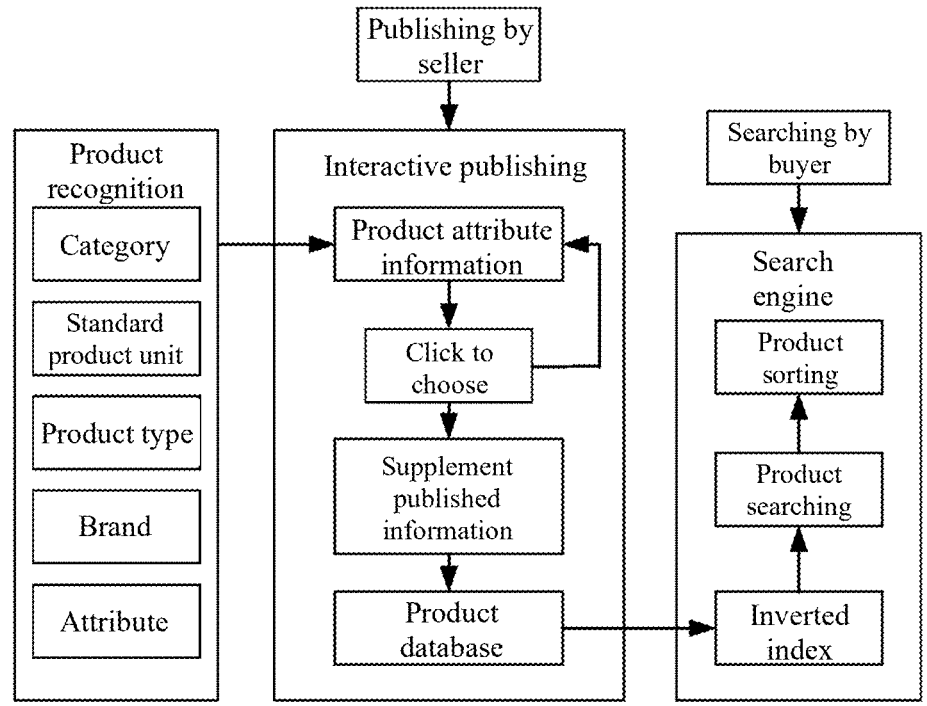
FIG. 3 is a schematic diagram of a product publishing method, according to an embodiment of the specification.

A first user, such as a seller or a merchant, may publish a product object on an eCommerce website. A second user, such as a buyer, may search for or browse the product object on the eCommerce website for purchase. FIG. 3 is a schematic diagram of an example in which a product object is published and searched for. A selling user may publish a to-be-sold product object on a web page of an eCommerce website through a client. The server device may provide a service for recognizing the product object, so that the selling user may set the structured information of the product object more conveniently.

An image of the product object is obtained in a manner of capturing or uploading an image on the client. The client generates a recognition request based on the image of the product object, and sends the recognition request to an image recognizer set of the server device to perform the image recognition. The image recognizer set obtains the image of the product object from the recognition request, conducts the image recognition on the image of the product object, and obtains a plurality of types of product attribute information. The image recognizer set may recognize the product attribute information of the product object such as a leaf category, a standard product unit (SPU), a category, a brand, and a product attribute, and returns the product attribute information as a recognition response to the client.

After the client receives the product attribute information returned by the image recognizer set, the user may determine the structured information of the product object by selecting corresponding product attribute information on the client. The structured information is associated to types of the product attribute information of the product object.

After obtaining the structured information of the product object, the user may supplement the published information. The published information may be description of the product object. For example, supplemented published information may include description of a product for example, a name or a title of the product object, a price of the product object, and a production date of the product object. Then, the structured information of the product object and the supplemented published information are combined. The product image of the product object, the structured information of the product object, the supplemented published information of the product object, and the like are used as product information of the product object, and are published on the server device. In addition, and the product information of the product object is stored in a product database of the server device to complete publishing the product object. The product database is a database configured to store product information published on the eCommerce website. The product information may include structured information, sale information such as inventory, and the like of a product object.

After the product is published, the product object may be found through searching on the eCommerce website. The eCommerce website may provide a search engine. The search engine may establish an inverted index of product information of product objects. The inverted index is used for storing correspondences between attributes of the product objects and storage locations of the product objects. In a process of searching for a product object, a buyer may query the inverted index according to a keyword, to determine the storage locations corresponding to the product information of a plurality of product objects matching the keyword, and sort the plurality of product objects according to a corresponding sorting rule. Then, product information of product objects is displayed according to the sorting relationship for the user to purchase. The sorting rule of the product objects may be determined according to, but not limited to, a time rule, a rule of the number of times of being searched for, a rule of the number of times of being checked, or the like.

Figure 4:
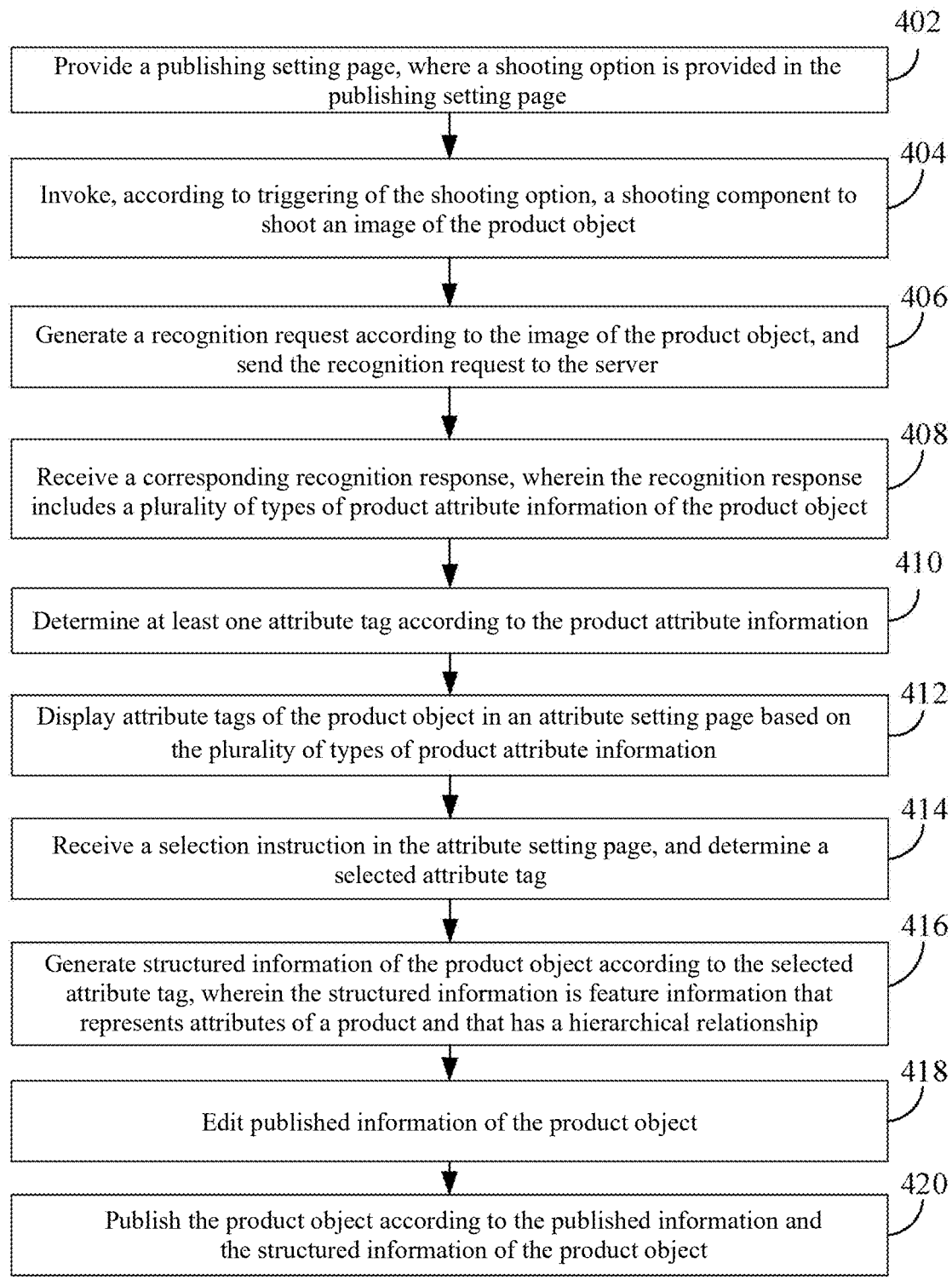
FIG. 4 is a flowchart of a product object publishing method, according to an embodiment of the specification.

Based on the foregoing embodiments, this embodiment provides a product object publishing method. As shown in FIG. 4, the method includes the following steps.

Step 402: Provide a publishing setting page, where a shooting option is provided in the publishing setting page.

Step 404: Invoke, according to triggering of the shooting option, a shooting component to shoot an image of the product object.

The shooting option may be provided in the publishing setting page. The publishing setting page is a page used for publishing the product object. The shooting option may be a shooting button. With reference to FIG. 5, in the example of a publishing setting page at the left side in FIG. 5, a control corresponding to "+" is a shooting option. A user may click the shooting option of "+" in the publishing setting page to invoke a shooting component to shoot an image, or to select an image from an album for uploading the product image. A plurality of images at different angles of a product object are shown. Therefore, after an image is uploaded, the shooting button may be triggered to shoot or obtain another image at another angle.

Step 406: Generate a recognition request according to the image of the product object, and send the recognition request to a server.

After at least one image is uploaded, structured information may be edited in an editing region of the publishing setting page. In an example of the publishing setting page shown in FIG. 5, it is prompted that content, such as Brand and model, Condition, Purchase channel, or Resale reason, can be edited, and a user may edit and input related information in the editing region. Structured information is generally needed for publishing of a product object. The user may trigger an option of "more information." A recognition request may be generated and sent based on the triggered option. The recognition request may transmit one or more uploaded images to a server device.

If information of a title or product description has been edited before the recognition request is sent, the information may also be added to the recognition request, to help recognize the product object, for example, to help the determination in the recognition processes of image recognizers of some types.

Step 408: Receive a corresponding recognition response, wherein the recognition response includes a plurality of types of product attribute information of the product object.

Step 410: Determine at least one attribute tag according to the product attribute information.

Step 412: Display attribute tags of the product object in an attribute setting page based on types.

In an example in FIG. 5, after triggering the option "More information," the client may send the image to the server device for recognition. Correspondingly, the client may receive the product attribute information returned by the server device, and determine a corresponding attribute tag based on the product attribute information. In the attribute setting page, for example, the page at the left side in FIG. 5, the corresponding attribute tag in the attribute setting page may be selected to obtain the structured information.

The recognized category is Daily household, a leaf category is Water Flask, a style includes Chinese style, Korean style, American style, Japanese style, and the like for the user to select, an element includes Pure color, Candy color, Fresh, Retro, and the like for the user to select, and a material includes Plastic, and Metal, and the like for the user to select. In addition to the product attribute information recognized by the server device, the attribute setting page may further display other default tags, popular tags, or the like. For example, "Brand new, unused plastic Flask," "Brand new, unused portable Flask," or the like may be selected from the popular tags. Some default tags, such as "Brand new," "No negotiation," and "Self-pick-up only" may also be selected in a common option region. Therefore, the user may select various needed tags in the attribute setting page.

Step 414: Receive a selection instruction in the attribute setting page, and determine a selected attribute tag.

Step 416: Generate structured information of the product object according to the selected attribute tag.

Step 418: Edit published information of the product object.

A selection instruction made by the user for an attribute tag is received in the attribute setting page. An attribute tag selected by the user may be determined. The structured information of the product object is generated. After a first attribute tag is selected, the publishing setting page is returned to by triggering an option "OK." Then, all or a portion of the determined structured information may be displayed in the publishing setting page. For example, a setting page, in FIG. 5, displays "Daily household". Subsequently, the user may further edit the published information of the product object in the publishing setting page. Therefore, the product object can be published with reference to the structured information of the product object. For example, the user may edit description of the product object in the editing region, for example, edit a purchase channel, a resale reason, and the like based on prompts. The user may further edit a price of the product object in a price editing region.

Step 420: Publish the product object according to the published information and the structured information of the product object.

After the user completes editing various information required for publishing, the user may click a publishing option, or a confirmation button in other embodiments. The client stores the attribute information, such as the product image of the product object, the structured information of the product object, and the published information of the product object, into the product database, and completes publishing the product object.

In this embodiment, the attribute of the product object is recognized by using the image recognizer set. The user selects the attribute information of the product object based on the product attribute information obtained through image recognition. It is convenient for users to determine the structured information of the product and publish the product object.

Figure 6:
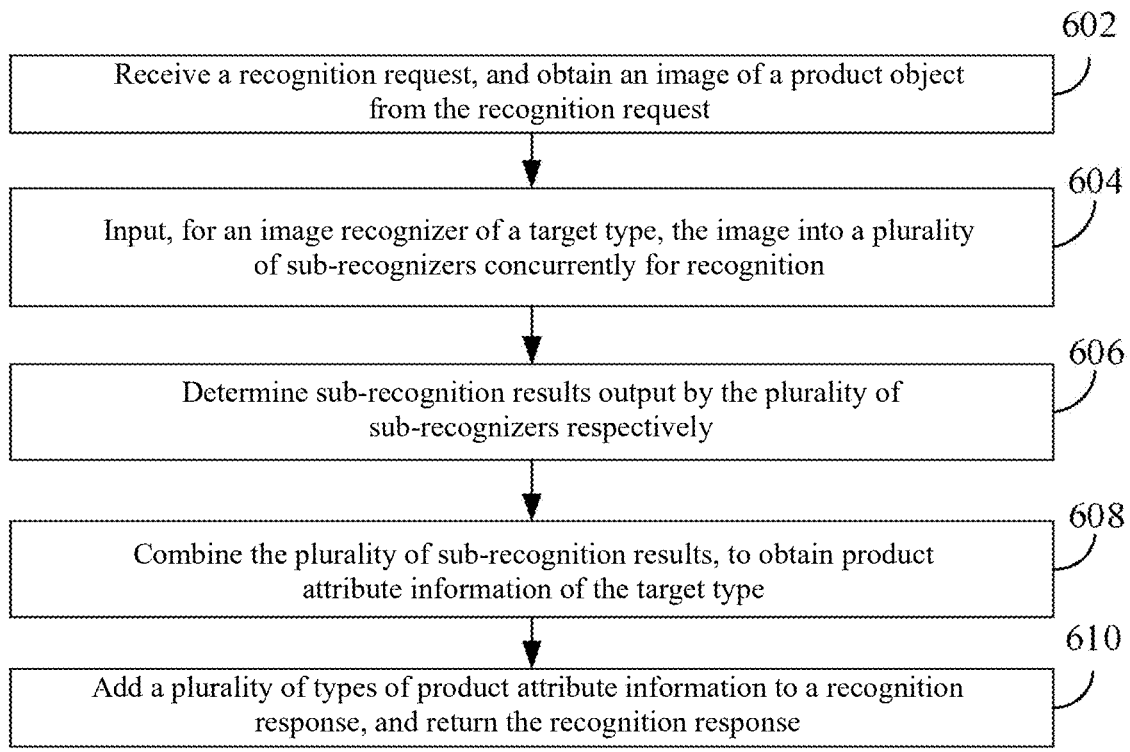
FIG. 6 is a flowchart of a product object recognition method, according to an embodiment of the specification.

Based on the foregoing embodiments, this embodiment provides a product object recognition method. As shown in FIG. 6, the method includes the following steps.

Step 602: Receive a recognition request, and obtain an image of a product object from the recognition request.

Step 604: Input, for an image recognizer of a target type, the image into a plurality of sub-recognizers concurrently for image recognition.

Step 606: Determine sub-recognition results outputted by the plurality of sub-recognizers respectively.

Step 608: Combine the plurality of sub-recognition results, to obtain product attribute information of the target type.

Step 610: Add a plurality of types of product attribute information to a recognition response, and return the recognition response to the client.

The image recognizer set receives the recognition request, and obtains the image from the recognition request. For the image recognizer of the target type, the image is inputted into the plurality of sub-recognizers for recognition, to obtain sub-recognition results. The sub-recognition results are combined to obtain the product attribute information of the target type. The product attribute information obtained through the image recognition by a plurality of types of image recognizers is collected to obtain the plurality of types of product attribute information. The plurality of types of product attribute information are added to a recognition response corresponding to the recognition request and are returned to the client. The client completes publishing of the product object according to the product attribute information.

In this embodiment, the plurality of types of product attribute information are recognized by using the plurality of types of image recognizers, so that the product attribute information can be recognized more quickly, and the product object can be published more conveniently.

It should be noted that for a simple description, the method embodiments are all described as a series of combinations of actions. However, a person skilled in the art should know that the embodiments of the specification are not limited by the described action sequences, some steps may be performed in other sequences or simultaneously according to the embodiments of the specification. Further, a person skilled in the art should also know that the embodiments described in the specification are some of the embodiments, and the actions involved are not necessarily required by the other embodiments of the specification.

Figure 7:
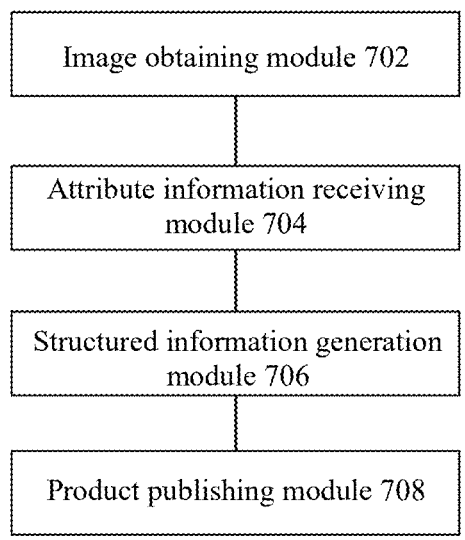
FIG. 7 is a structural block diagram of a product object publishing apparatus, according to an embodiment of the specification.

Based on the foregoing embodiments, this embodiment further provides a product object publishing apparatus. Referring to FIG. 7, the apparatus includes the following modules: an image obtaining module 702, configured to obtain an image of a product object; an attribute information receiving module 704, configured to receive a plurality of types of product attribute information, wherein the product attribute information is obtained according to image recognition on the image of the product object performed by an image recognizer set; a structured information generation module 706, configured to generate structured information of the product object according to selection of the product attribute information; and a product publishing module 708, configured to publish the product object according to the structured information of the product object.

In conclusion, product attribute information of a to-be-published product object can be recognized by the image recognizer set based on an image of the product object. The product attribute information is provided to the user, to quickly set the structured information of the product object, and publish the product object with reference to edited published information of the product object. In a process of publishing the product object, the user does not need to fill in all the product information, so that the user publishes the product object more conveniently.

In an embodiment of the specification, the image obtaining module 702 includes: a publishing page providing sub-module, configured to provide a publishing setting page, where a shooting option is provided in the publishing setting page; and an image obtaining sub-module, configured to invoke, according to triggering of the shooting option, a shooting component to shoot an image of the product object.

In an embodiment of the specification, the apparatus includes: a request sending module, configured to generate a recognition request according to the image of the product object, and send the recognition request.

The attribute information receiving module 704 includes: an information returning sub-module, configured to receive a corresponding recognition response, wherein the recognition response includes the plurality of types of product attribute information of the product object.

In an embodiment of the specification, the recognition response may further include association relationships among the plurality of types of product attribute information. The structured information generation module 706 includes: a target selection obtaining sub-module, configured to receive a selection instruction for target product attribute information; an associated-attribute obtaining sub-module, configured to determine, according to the association relationships, product attribute information associated with the target product attribute information; an associated-attribute dynamic-display sub-module, configured to display the product attribute information associated with the target product attribute information for selection; and a structured information obtaining sub-module, configured to generate, based on a hierarchical relationship or structure, the structured information of the product object according to a plurality of pieces of selected product attribute information.

In an embodiment of the specification, the apparatus further includes: a tag obtaining module, configured to determine, according to product attribute information of a target type, at least one attribute tag corresponding to the target type; and a tag displaying module, configured to display the attribute tag of the product object in an attribute setting page based on a type.

In an embodiment of the specification, the structured information generation module 706 includes: a tag selection sub-module, configured to receive a selection instruction in the attribute setting page, and determine a selected attribute tag; and a structured information generation sub-module, configured to generate the structured information of the product object according to the selected attribute tag.

In an embodiment of the specification, the apparatus further includes: a custom processing module, configured to receive a custom tag in the attribute setting page, and add the custom tag to the structured information of the product object.

In an embodiment of the specification, the product publishing module 708 includes: a published information editing sub-module, configured to edit published information of the product object; and a product publishing sub-module, configured to publish the product object according to the published information and the structured information of the product object.

Figure 8:
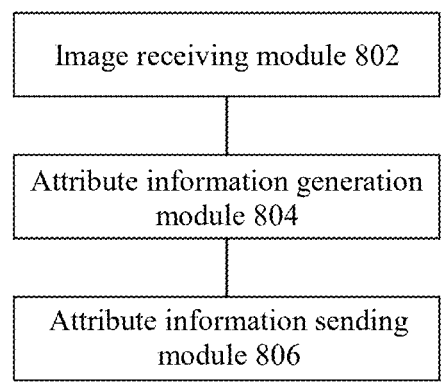
FIG. 8 is a structural block diagram of a product object recognition apparatus, according to an embodiment of the specification.

Based on the foregoing embodiments, this embodiment provides a product object recognizing apparatus. As shown in FIG. 8, the apparatus includes: an image receiving module 802, configured to receive an image of a product object; an attribute information generation module 804, configured to input the image into an image recognizer set to obtain a plurality of types of product attribute information; and an attribute information sending module 806, configured to return the plurality of types of product attribute information, to determine structured information of the product object according to the product attribute information, and publish the product object.

In conclusion, product attribute information of a to-be-published product object can be recognized by the image recognizer set based on an image of the product object. The product attribute information is provided to the user, to quickly set the structured information of the product, and publish the product object with reference to the edited published information of the product object. In a process of publishing the product object, the user does not need to fill in all the product information, so that the user can publish the product object more conveniently.

In an embodiment of the specification, the image recognizer set includes a plurality of types of image recognizers. The attribute information generation module 804 includes: an attribute information generation sub-module, configured to input the image into the plurality of types of image recognizers concurrently for image recognition, and obtain the plurality of types of product attribute information.

In an embodiment of the specification, each type of image recognizer includes a plurality of sub-recognizers. The attribute information generation sub-module includes: an image input sub-module, configured to input, for an image recognizer of a target type, the image into the plurality of sub-recognizers concurrently for recognition; a recognition result determining sub-module, configured to determine sub-recognition results outputted by the plurality of sub-recognizers respectively; and a recognition result combining sub-module, configured to combine the plurality of sub-recognition results, to obtain product attribute information of the target type.

In an embodiment of the specification, the image recognizer is obtained through training according to a deep convolutional neural network, and training data of the image recognizer is determined according to product object information of an eCommerce website.

In an embodiment of the specification, the product object information includes target structured information of a target product object, and the target structured information is related to a type of the product attribute information.

In an embodiment of the specification, the type of the product attribute information includes at least one of the following items: a brand, a category, a leaf category, an SPU, and a product attribute.

In an embodiment of the specification, the image receiving module 802 includes an image receiving sub-module, configured to receive a recognition request, and obtain the image of the product object from the recognition request.

The attribute information sending module 806 includes an attribute information sending sub-module, configured to add the plurality of types of product attribute information to a recognition response, and return the recognition response.

In an embodiment of the specification, the apparatus further includes: a popular-tag determining module, configured to determine a popular tag corresponding to the product object according to the plurality of types of product attribute information, wherein the popular tag is determined by collecting statistics on information related to the product object; and a popular-tag processing module, configured to include the popular tag in the product attribute information.

In an embodiment of the specification, the attribute information sending module 806 includes: a target type tag determining sub-module, configured to determine, according to product attribute information of a target type, at least one attribute tag corresponding to the target type; and a tag returning sub-module, configured to return attribute tags of a plurality of types.

In an embodiment of the specification, the apparatus further includes: an association relationship generation module, configured to obtain association relationships among the plurality of types of product attribute information; and an association relationship processing module, configured to add the association relationships to the recognition response.

The embodiments of the specification further provide a nonvolatile readable storage medium. The storage medium stores one or more programs. The one or more programs, when applied to a device, may cause the device to execute instructions in the steps of the methods in the embodiments of the specification.

The embodiments of the specification provide one or more machine-readable media, storing instructions. The instructions, when executed by one or more processors, cause an electronic device to perform the one or more methods in the foregoing embodiment. In this embodiment of the specification, the electronic device includes a terminal device such as a mobile phone, a tablet computer, or a PC, or may include a server device such as a server (or a server cluster).

Figure 9:
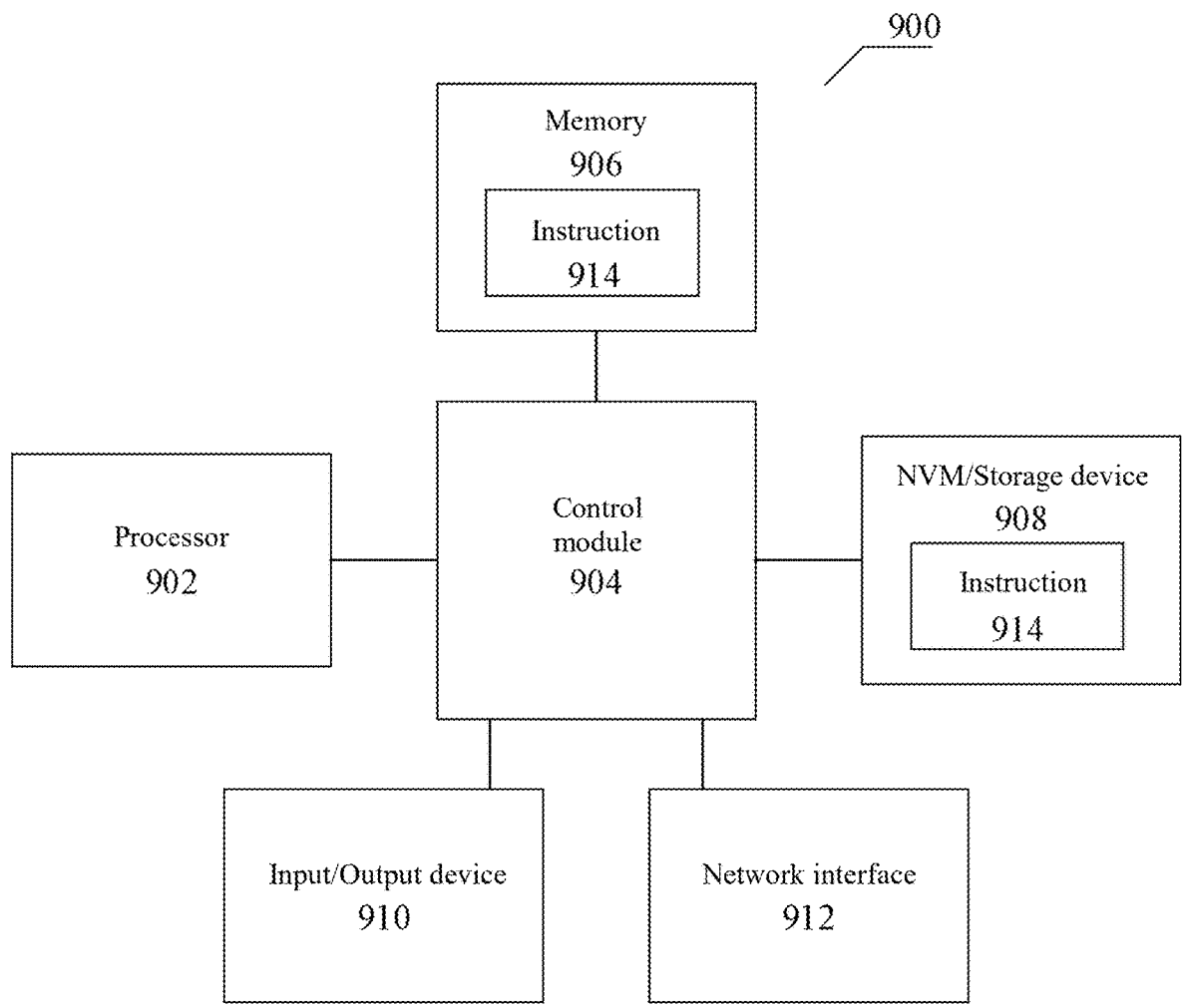
FIG. 9 is a schematic structural diagram of an apparatus, according to an embodiment of the specification.

The embodiments of the specification may be implemented as an apparatus that uses any proper hardware, firmware, software, and any combination thereof to perform desired configuration. The apparatus may include an electronic device such as a server (or a server cluster) or a terminal device. FIG. 9 schematically shows an apparatus 900 that may be configured to implement the embodiments described in the specification.

In an embodiment, FIG. 9 shows the apparatus 900. The apparatus includes one or more processors 902, a control module (a chip set) 904 coupled to at least one of the (one or more) processors 902, a memory 906 coupled to the control module 904, a nonvolatile memory (NVM)/storage device 908 coupled to the control module 904, one or more input/output devices 910 coupled to the control module 904, and a network interface 912 coupled to the control module 904.

The processor 902 may include one or more single-core or multi-core processors. The processor 902 may include any combination of a general-purpose processor or a special-purpose processor (for example, a graphics processing unit, an application processor, or a baseband processor). In some embodiments, the apparatus 900 may be used as various electronic devices of the server device and the terminal described in the embodiments of the specification.

In some embodiments, the apparatus 900 may include one or more computer-readable media (for example, the memory 906 or the NVM/storage device 908) including instructions 914, and one or more processors 902 that are coupled to the one or more computer-readable media and that are configured to execute instructions 914 to implement modules to perform the actions described in the specification.

In an embodiment, the control module 904 may include any proper interface controllers to provide any proper interfaces to at least one of the (one or more) processors 902 and/or any appropriate devices or components in communication with the control module 904.

The control module 904 may include a memory controller module to provide an interface to the memory 906. The memory controller module may be a hardware module, a software module, and/or a firmware module.

The memory 906 may be configured to, for example, load and store data and/or the instructions 914 for the apparatus 900. In an embodiment, the memory 906 may include any appropriate volatile memory such as an appropriate DRAM. In some embodiments, the memory 906 may include a double data rate 4 synchronous dynamic random-access memory (DDR4 SDRAM).

In an embodiment, the control module 904 may include one or more input/output controllers to provide interfaces to the NVM/storage device 908 and the (one or more) input/output devices 910.

For example, the NVM/storage 908 may be configured to store the data and/or the instructions 914. The NVM/storage device 908 may include any appropriate NVM (for example, a flash memory) and/or may include any appropriate (one or more) nonvolatile storage devices (for example, one or more hard disc drives (HDDs), one or more optical disc (CD) drives, and/or one or more digital versatile disc (DVD) drives).

The NVM/storage device 908 may include a storage resource logistically serving as a portion of a device on which the apparatus 900 is installed, or is accessible to the device and may not necessarily be a portion of the device. For example, the NVM/storage device 908 may be accessed through a network by using the (one or more) input/output devices 910.

The (one or more) input/output devices 910 may provide an interface for the apparatus 900 to communicate with any other appropriate device. The input/output device 910 may include a communication component, an audio component, a sensor component, or the like. The network interface 912 may provide an interface for the apparatus 900 to communicate by using one or more networks. The apparatus 900 may communicate with one or more components of a wireless network in a wireless manner according to any standard and/or protocol in one or more wireless network standards and/or protocols, for example, access, based on communication standards, wireless networks such as a Wi-Fi network, a 2G network, a 3G network, a 4G network, a 5G network, or communicate with a combination of the wireless networks.

In an embodiment, at least one of the (one or more) processors 902 may be packaged with logic of one or more controllers (for example, a memory controller module) of the control module 904. In an embodiment, at least one of the (one or more) processors 902 may be packaged with logic of one or more controllers of the control module 904 to form a system in package (SiP). In an embodiment, at least one of the (one or more) processors 902 may be integrated with logic of one or more controllers of the control module 904 on the same mold. In an embodiment, at least one of the (one or more) processors 902 may be integrated with logic of one or more controllers of the control module 904 on the same mold to form a system on chip (SoC).

In various embodiments, the apparatus 900 may be, but is not limited to, a terminal device such as a server, a desktop computing device, or a mobile computing device (for example, a laptop computing device, a handheld computing device, a tablet computer, or a netbook). In various embodiments, the apparatus 900 may include more or fewer components and/or a different architecture. For example, in some embodiments, the apparatus 900 includes one or more cameras, a keyboard, a liquid crystal display (LCD) screen (including a touchscreen display), an NVM port, a plurality of antennas, a graphics chip, an application-specific integrated circuit (ASIC), and a speaker.

A detection apparatus may use a main control chip as the processor or the control module. Sensor data, location information, and the like are stored in the memory or the NVM/storage device. A sensor set may be used as the input/output device. The communication interface may include a network interface.

The embodiments of the specification further provide an electronic device, including a processor; and a memory, storing executable code, wherein the executable code, when executed, causes the processor to perform the one or more of the methods in the embodiments of the specification.

The embodiments of the specification further provide one or more machine-readable media, storing executable code, wherein the executable code, when executed, causes a processor to perform the one or more of the methods in the embodiments of the specification.

The apparatus embodiments are substantially similar to the method embodiments and therefore are only briefly described, and reference may be made to the method embodiments for the corresponding sections.

The embodiments in this specification are all described in a progressive manner, each embodiment focuses on a difference from other embodiments, and for same or similar parts in the embodiments, reference may be made to these embodiments.

The embodiments of the specification are described with reference to flowcharts and/or block diagrams of the method, the terminal device (system), and the computer program product in the embodiments of the specification. Computer program instructions can implement each procedure and/or block in the flowcharts and/or block diagrams, and a combination of procedures and/or blocks in the flowcharts and/or block diagrams. The computer program instructions may be provided for a general-purpose computer, a dedicated computer, an embedded processor, or a processor of any other programmable data processing terminal device to generate a machine, so that the instructions executed by a computer or a processor of any other programmable data processing terminal device generate an apparatus for implementing functions specified in one or more processes in the flowcharts and/or in one or more blocks in the block diagrams.

These computer program instructions may also be stored in a computer-readable memory that can guide a computer or another programmable data processing terminal device to work in a specific manner, so that the instructions stored in the computer-readable memory generate a product including an instruction apparatus, wherein the instruction apparatus implements functions specified in one or more processes in the flowcharts and/or in one or more blocks in the block diagrams.

These computer program instructions may also be loaded onto a computer or another programmable data processing terminal device, so that a series of operations and steps are performed on the computer or another programmable terminal device to generate computer-implemented processing. Therefore, the instructions executed on the computer or another programmable terminal device provide steps for implementing functions specified in one or more processes in the flowcharts and/or in one or more blocks in the block diagrams.

Although some embodiments of the specification have been described, a person skilled in the art may make changes and modifications to the embodiments once learning the basic inventive concept. Therefore, the following claims cover the embodiments and all changes and modifications falling within the scope of the embodiments of the specification.

At last, it should be noted that, in this specification, relational terms such as first and second are used only to distinguish one entity or operation from another, and do not necessarily require or imply any actual relationship or sequence between the entities or operations. Moreover, the terms "comprise," "include," and any variation thereof are intended to cover a non-exclusive inclusion. Therefore, in the context of a process, a method, an object, or a device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, method, object, or terminal device that includes the element.

The product object publishing method and apparatus, the product object recognition method and apparatus, the electronic device, and the storage medium that are provided in the specification are described in detail above. The principle and implementations of the specification are described herein by using specific examples. The descriptions of the foregoing embodiments are merely used for helping understand the method and core ideas of the specification. In addition, a person skilled in the art can make changes to the specification in terms of the specific implementations and application scopes according to the ideas of the specification. Therefore, the content of this specification shall not be construed as a limitation on the specification.

What is claimed is:

1. A product object publishing method, comprising:
obtaining, by a client application associated with a website, an image of a product object;
inputting, by the client application, the image to an image recognizer set to generate a plurality of types of product attribute information, wherein the image recognizer set comprises a plurality of machine learning models respectively corresponding to the plurality of types of product attribute information, and the inputting comprises:
concurrently inputting the image into the plurality of machine learning models for concurrent image recognition and outputting corresponding types of product attribute information:
training the plurality of machine learning models, the training comprising:
pulling structured information and images of published product objects from a database of the website, wherein the structured information comprises a brand, a category, a material, a condition, or a model of a published product; and
training, for each of the plurality of types of product attribute information, a machine learning model based on the pulled images and corresponding structured information for recognizing the corresponding type of product attribute information for a given image, thereby obtaining the plurality of machine learning models;
wherein one of the plurality of machine learning models comprises a plurality of sub-recognizers, and the concurrently inputting the image comprises:
concurrently inputting the image into the plurality of sub-recognizers of the one machine learning model;
determining sub-recognition results outputted by the plurality of sub-recognizers respectively, wherein the sub-recognition results comprise different portions of a type of product attribute information of the image; and
combining the sub-recognition results to obtain the type of product attribute information of the image;
receiving, by the client application, the plurality of types of product attribute information of the product object from the image recognizer set;
determining, by the client application, a plurality of attribute tags for the product object based on statistics of search keywords corresponding to the product object, wherein the determining comprises:
computing, for each of the search keywords, a ratio between a number of times a search keyword appears in association with purchases of the product object and a number of times the search keyword appears in association with views of the product object,
selecting top-N of the search keywords as the plurality of attribute tags of the product object based on the computed ratios, N being an integer greater than one, and
assigning a weight to each of the plurality of attribute tags for subsequent selection;
displaying, by the client application, the plurality of types of product attribute information and the plurality of attribute tags of the product object for selection by a user;
generating, by the client application, structured information of the product object according to selection of the product attribute information and the one or more attribute tags; and
publishing, by the client application, the product object, wherein the publishing comprises publishing the image and structured information of the product object.

2. The method according to claim 1, wherein the obtaining an image of a product object comprises:
displaying a publishing setting page, wherein a shooting option is provided in the publishing setting page or invoking a different application to select a pre-shot image of the product object; and
invoking, according to triggering of the shooting option, a shooting component of the client application to shoot an image of the product object.

3. The method according to claim 1, wherein:
the inputting the image comprises generating a recognition request according to the image of the product object, and sending the recognition request to a server; and
the receiving the plurality of types of product attribute information comprises receiving a recognition response corresponding to the recognition request, wherein the recognition response comprises the plurality of types of product attribute information of the product object.

4. The method according to claim 3, wherein
the recognition response further comprises association relationships among the plurality of types of product attribute information, and
the generating structured information of the product object according to selection of the product attribute information comprises:
receiving a selection instruction for target product attribute information;
determining, according to the association relationships, product attribute information associated with the target product attribute information;
displaying the product attribute information associated with the target product attribute information for selection; and
generating, based on a hierarchical structure, the structured information of the product object according to a plurality of pieces of selected product attribute information.

5. The method according to claim 1, further comprising:
receiving, by the client application, a custom tag from the user, and adding the custom tag to the structured information of the product object.

6. A product object publishing system comprising:
a processor; and
a non-transitory computer-readable storage medium storing instructions executable by the processor to cause the system to perform operations comprising:
obtaining an image of a product object for publishing on a website;
inputting the image to an image recognizer set on a server to generate a plurality of types of product attribute information, wherein the image recognizer set comprises a plurality of machine learning models respectively corresponding to the plurality of types of product attribute information, and the inputting comprises:
concurrently inputting the image into the plurality of machine learning models for concurrent image recognition and outputting corresponding types of product attribute information;
training the plurality of machine learning models, the training comprising:
pulling structured information and images of published product objects from a database of the website, wherein the structured information comprises a brand, a category, a material, a condition, or a model of a published product; and
training, for each of the plurality of types of product attribute information, a machine learning model based on the pulled images and corresponding structured information for recognizing the corresponding type of product attribute information for a given image, thereby obtaining the plurality of machine learning models;
wherein one of the plurality of machine learning models comprises a plurality of sub-recognizers, and the concurrently inputting the image comprises:
concurrently inputting the image into the plurality of sub-recognizers of the one machine learning model;
determining sub-recognition results outputted by the plurality of sub-recognizers respectively, wherein the sub-recognition results comprise different portions of a type of product attribute information of the image; and
combining the sub-recognition results to obtain the type of product attribute information of the image;

receiving the plurality of types of product attribute information of the product object from the image recognizer set on the server;

determining a plurality of attribute tags for the product object based on statistics of search keywords corresponding to the product object, wherein the determining comprises:

computing, for each of the search keywords, a ratio between a number of times a search keyword appears in association with purchases of the product object and a number of times the search keyword appears in association with views of the product object, selecting top-N of the search keywords as the plurality of attribute tags of the product object based on the computed ratios, N being an integer greater than one, and assigning a weight to each of the plurality of attribute tags for subsequent selection;

displaying the plurality of types of product attribute information and the plurality of attribute tags of the product object for selection by a user;

generating structured information of the product object according to selection of the product attribute information and the one or more attribute tags; and publishing the image and structured information of the product object.

7. The product object publishing system according to claim 6, wherein:

the inputting the image comprises generating a recognition request according to the image of the product object, and sending the recognition request to a server; and the receiving the plurality of types of product attribute information comprises receiving a recognition response corresponding to the recognition request, wherein the recognition response comprises the plurality of types of product attribute information of the product object.

8. The product object publishing system according to claim 7, wherein the recognition response further comprises association relationships among the plurality of types of product attribute information, and the generating structured information of the product object according to selection of the product attribute information comprises:

receiving a selection instruction for target product attribute information;

determining, according to the association relationships, product attribute information associated with the target product attribute information;

displaying the product attribute information associated with the target product attribute information for selection; and generating, based on a hierarchical structure, the structured information of the product object according to a plurality of pieces of selected product attribute information.

9. The product object publishing system according to claim 6, wherein the obtaining an image of a product object comprises:

displaying a publishing setting page, wherein a shooting option is provided in the publishing setting page or invoking a different application to select a pre-shot image of the product object; and invoking, according to triggering of the shooting option, a shooting component of the client application to shoot an image of the product object.

10. The product object publishing system according to claim 6, wherein the operations further comprise:

receiving a custom tag from the user, and adding the custom tag to the structured information of the product object.

11. A non-transitory computer-readable storage medium configured with instructions executable by one or more processors to cause the one or more processors to perform operations comprising:

obtaining an image of a product object for publishing on a website;

inputting the image to an image recognizer set on a server to generate a plurality of types of product attribute information, wherein the image recognizer set comprises a plurality of machine learning models respectively corresponding to the plurality of types of product attribute information, and the inputting comprises:

concurrently inputting the image into the plurality of machine learning models for concurrent image recognition and outputting corresponding types of product attribute information;

training the plurality of machine learning models, the training comprising:

pulling structured information and images of published product objects from a database of the website, wherein the structured information comprises a brand, a category, a material, a condition, or a model of a published product; and training, for each of the plurality of types of product attribute information, a machine learning model based on the pulled images and corresponding structured information for recognizing the corresponding type of product attribute information for a given image, thereby obtaining the plurality of machine learning models;

wherein one of the plurality of machine learning models comprises a plurality of sub-recognizers, and the concurrently inputting the image comprises:

concurrently inputting the image into the plurality of sub-recognizers of the one machine learning model;

determining sub-recognition results outputted by the plurality of sub-recognizers respectively, wherein the sub-recognition results comprise different portions of a type of product attribute information of the image; and combining the sub-recognition results to obtain the type of product attribute information of the image;

receiving the plurality of types of product attribute information of the product object from the image recognizer set on the server;

determining a plurality of attribute tags for the product object based on statistics of search keywords corresponding to the product object, wherein the determining comprises:

computing, for each of the search keywords, a ratio between a number of times a search keyword appears in association with purchases of the product object and a number of times the search keyword appears in association with views of the product object, selecting top-N of the search keywords as the plurality of attribute tags of the product object based on the computed ratios, N being an integer greater than one, and assigning a weight to each of the plurality of attribute tags for subsequent selection;

displaying the plurality of types of product attribute information and the plurality of attribute tags of the product object for selection by a user;

generating structured information of the product object according to selection of the product attribute information and the one or more attribute tags; and publishing the image and structured information of the product object.

12. The non-transitory computer-readable storage medium of claim 11, wherein:

the inputting the image comprises generating a recognition request according to the image of the product object, and sending the recognition request to a server; and the receiving the plurality of types of product attribute information comprises receiving a recognition response corresponding to the recognition request, wherein the recognition response comprises the plurality of types of product attribute information of the product object.

13. The non-transitory computer-readable storage medium of claim 12, wherein the recognition response further comprises association relationships among the plurality of types of product attribute information, and the generating structured information of the product object according to selection of the product attribute information comprises:

receiving a selection instruction for target product attribute information;

determining, according to the association relationships, product attribute information associated with the target product attribute information;

displaying the product attribute information associated with the target product attribute information for selection; and generating, based on a hierarchical structure, the structured information of the product object according to a plurality of pieces of selected product attribute information.

14. The non-transitory computer-readable storage medium of claim 11, wherein the obtaining an image of a product object comprises:

displaying a publishing setting page, wherein a shooting option is provided in the publishing setting page or invoking a different application to select a pre-shot image of the product object; and invoking, according to triggering of the shooting option, a shooting component of the client application to shoot an image of the product object.

15. The non-transitory computer-readable storage medium of claim 11, wherein the operations further comprise:

receiving, by the client application, a custom tag from the user, and adding the custom tag to the structured information of the product object.

* * * * *